United States Patent
Lo

(10) Patent No.: US 8,438,443 B2
(45) Date of Patent: May 7, 2013

(54) PATTERN-DEPENDENT ERROR CORRECTION METHOD AND SYSTEM

(75) Inventor: Ya-Ling Lo, Tainan County (TW)

(73) Assignee: Himax Media Solutions, Inc., Tainan County (TW)

( * ) Notice: Subject to any disclaimer, the term of this patent is extended or adjusted under 35 U.S.C. 154(b) by 254 days.

(21) Appl. No.: 13/005,406

(22) Filed: Jan. 12, 2011

(65) Prior Publication Data

US 2012/0179933 A1    Jul. 12, 2012

(51) Int. Cl.
*G06F 11/00*    (2006.01)
(52) U.S. Cl.
USPC ............................ 714/746; 714/795; 714/788
(58) Field of Classification Search .................. 714/746, 714/795, 796, 785, 781, 788, 758, 755
See application file for complete search history.

(56) References Cited

U.S. PATENT DOCUMENTS

| | | | |
|---|---|---|---|
| 6,990,625 B2 * | 1/2006 | Fujiwara et al. | 714/788 |
| 8,086,941 B2 * | 12/2011 | Williamson et al. | 714/785 |
| 8,108,759 B2 * | 1/2012 | Moon et al. | 714/781 |
| 8,201,064 B2 * | 6/2012 | Ferguson | 714/795 |

* cited by examiner

*Primary Examiner* — Fritz Alphonse
(74) *Attorney, Agent, or Firm* — Stout, Uxa, Buyan & Mullins, LLP

(57) ABSTRACT

A pattern-dependent error correction method and system for a code group alignment finite state machine (FSM) are disclosed. A state corrector generates a start-of-stream delimiter (SSD) detected signal to the FSM when the FSM is in an idle state and at least one condition due to a lost SSD signal is met; and the state corrector generates an idle detected signal to the FSM when at least one condition due to a lost idle signal is met. A pattern corrector generates a corrected code pattern {J,K} to FSM when the FSM is in an idle state and at least one condition due to a false idle state is met; and the pattern corrector generates a corrected code pattern {T,R} to the FSM when the FSM is in a data state, a start of stream state or a data error state, and at least one condition due to a false packet end is met.

20 Claims, 5 Drawing Sheets

PATTERN-DEPENDENT ERROR CORRECTION METHOD AND SYSTEM

BACKGROUND OF THE INVENTION

1. Field of the Invention

The present invention generally relates to a computer network, and more particularly to a Fast Ethernet receiver with error correction capability.

2. Description of Related Art

Ethernet is a packet-based computer networking that is widely used in constructing a local area network. Fast Ethernet or 100BASE-TX, for example, transfers data at a nominal rate of 100 Mbits/sec.

Fast Ethernet or 100BASE-TX is specified in IEEE 802.3, and may be run over category 5 (CAT5) unshielded twisted-pair (UTP) at 125 MHz symbol rate with segment length of 100 meters. According to Fast Ethernet specification, Fast Ethernet may provide bit error rate (BER) of less than $10^{-9}$ without additional forward error control coding (ECC). However, the specified BER cannot be assured oftentimes in real Fast Ethernet due to, for example, aged wiring, multiple segments connection, segment longer than the specified length, cable category lower than CAT5, or non-ideal parameters such as jitter, return loss or rise/fall time.

Data transmission errors may cause loss of a start-of-stream delimiter (SSD) state or loss of an idle state. The data transmission errors may also induce a false idle state or a false packet end. As conventional Fast Ethernet receiver implementation cannot oftentimes provide specified performance, a need has arisen to propose a novel Fast Ethernet receiver with a capability of correcting error without additional forward error control coding (ECC).

SUMMARY OF THE INVENTION

In view of the foregoing, it is an object of the embodiment of the present invention to provide a pattern-dependent error correction method and system for a code group alignment finite state machine (FSM) in a communication receiver that is capable of correcting multi-bit error utilizing pattern-dependent mechanism.

According to one embodiment, a receiving data and an FSM state signal are inputted. When the code group alignment FSM is determined to be in an idle state, one or more conditions associated with erroneous code patterns to recover a lost start-of-stream delimiter (SSD) signal that is supposedly present are determined. An SSD detected signal is generated and fed to the code group alignment FSM when one of the conditions for recovering the lost SSD signal is met. One or more conditions associated with erroneous code patterns to recover a lost idle signal that is supposedly present are determined according to the receiving data. An idle detected signal is generated and fed to the code group alignment FSM when one of the conditions for recovering the lost idle signal is met.

According to another embodiment, a receiving data, an FSM state signal and an error index signal indicative of credibility of the receiving data are inputted. When the code group alignment FSM is determined to be in an idle state, one or more conditions associated with erroneous code patterns to recover a ruined code pattern that is supposedly present without a false idle state are determined according to the receiving data and the error index signal. A corrected code pattern {J,K} is generated and fed to the code group alignment FSM when one of the conditions for recovering the ruined code pattern due to the false idle state is met. When the code group alignment FSM is determined to be in a data state, a start of stream state or a data error state, one or more conditions associated with erroneous code patterns to recover another ruined code pattern that is supposedly present without a false packet end are determined according to the receiving data and the error index signal. A corrected code pattern {T,R} is generated and fed to the code group alignment FSM when one of the conditions for recovering the ruined code pattern due to the false packet end is met.

DETAILED DESCRIPTION OF THE INVENTION

Figure 1:
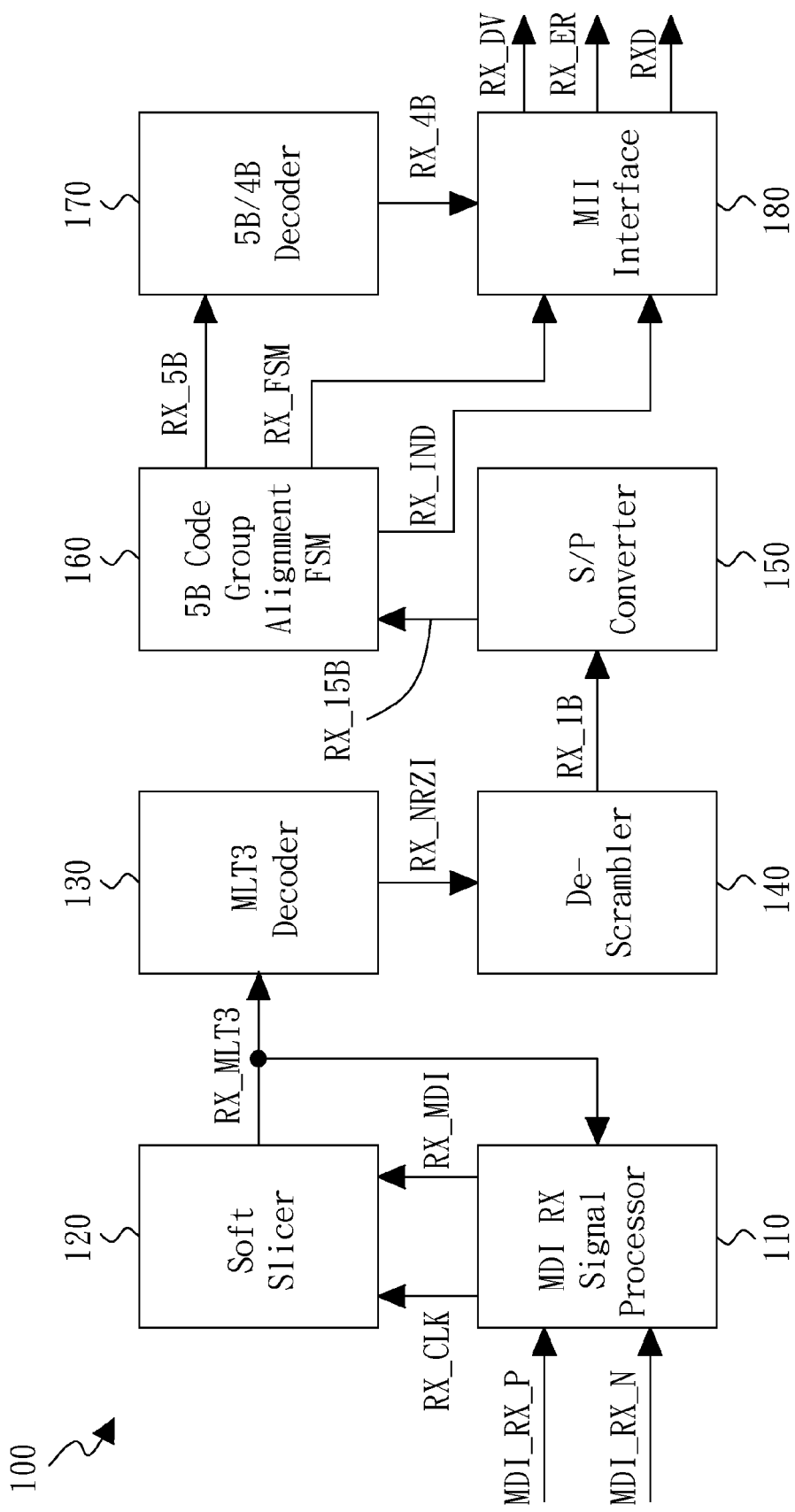
FIG. 1 shows a block diagram that illustrates a Fast Ethernet receiver.

FIG. 1 shows a block diagram that illustrates a Fast Ethernet receiver 100. Fast Ethernet is specified in IEEE 802.3, particularly IEEE Standard 802.3, 2000 Edition Clause 24, which is hereby incorporated by reference. Although 100BASE-TX or Fast Ethernet is illustrated in the following embodiment, other local area networks such as gigabit Ethernet may be adopted as well. Moreover, it is appreciated by those skilled in the pertinent art that portion of the embodiment described below may be implemented by hardware, software, firmware, a digital signal processor, an application-specific integrated circuit (ASIC) or their combination.

The receiver 100 may include a media dependent interface (MDI) receiver (RX) signal processor 110, a soft slicer 120, a multi-level transmit-3 (MLT3) decoder 130, a de-scrambler 140, a serial-to-parallel (S/P) converter 150, a 5-bit (5B) code group alignment finite state machine (FSM) 160, a 5-bit to 4-bit (5B/4B) decoder 170, and a media independent interface (MII) 180. Details of the receiver 100 may be referred to IEEE Standard 802.3 or co-pending U.S. patent application Ser. No. 12/791,801, filed on Jun. 1, 2010, entitled "Receiver with Capability of Correcting Error," assigned to the same assignee, the disclosure of which is hereby incorporated by reference.

Figure 2:
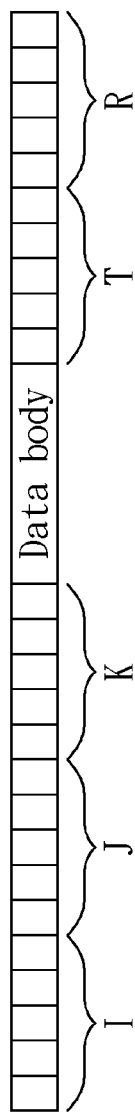
FIG. 2 schematically shows an exemplary packet.

Specifically, the 5B code group alignment FSM (or "FSM" for short) 160 primarily performs two functions: detecting 5-bit boundary and detecting packet boundary. FIG. 2 schematically shows an exemplary packet that includes, in order, I code, J code, K code, data body, T code, and R code, each having 5 bits. The 5-bit boundary may be detected based on the I code and the J code. The packet boundary may then be detected based on the other codes. Accordingly, the FSM 160 generates 5-bit data RX_5B. The FSM 160 also provides an FSM state signal RX_FSM and an indicator RX_IND. The FSM state signal RX_FSM denotes a current status of the FSM 160. A true indicator RX_IND indicates that the present status of the FSM 160 is at 5-bit boundary.

Figure 3:
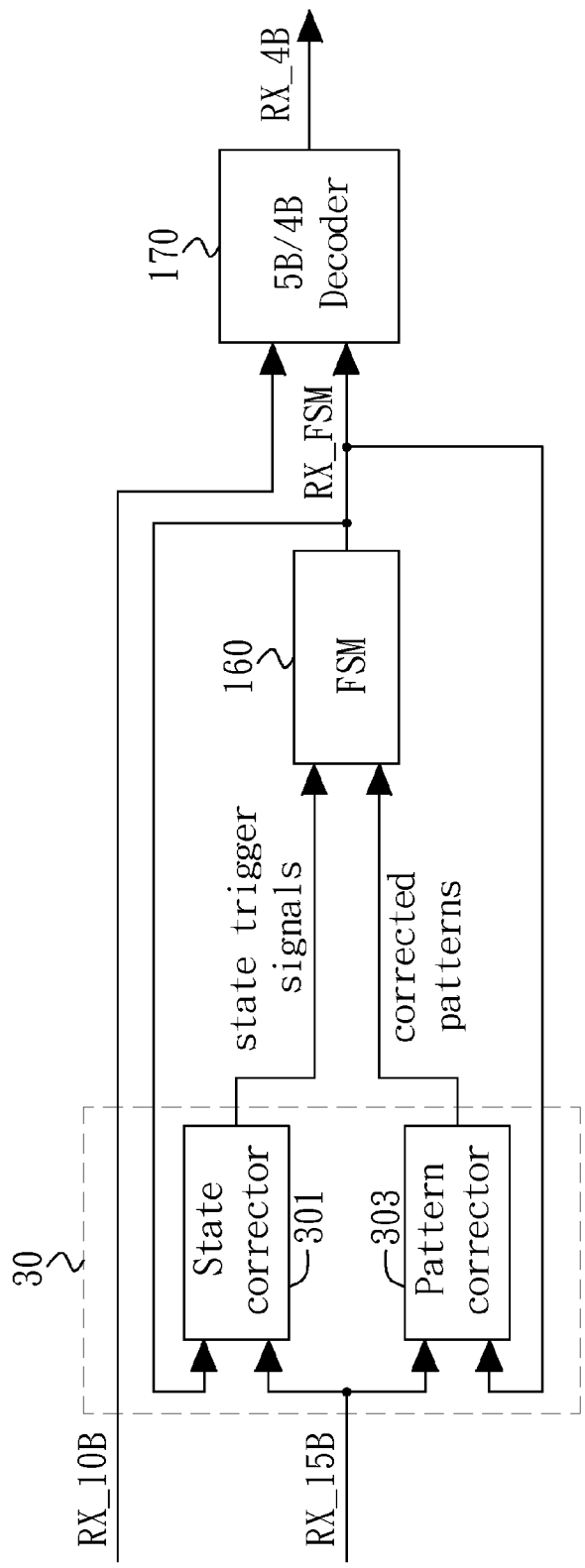
FIG. 3 shows a block diagram of a pattern-dependent error corrector according to one embodiment of the present invention.

FIG. 3 shows a block diagram of a pattern-dependent error corrector 30 according to one embodiment of the present invention. In the embodiment, the pattern-dependent error corrector 30 includes a state corrector 301 and a pattern corrector 303. It is noted that the state corrector 301 and the pattern corrector 303 may be utilized alone or in combination according to specific applications.

Figure 4A:
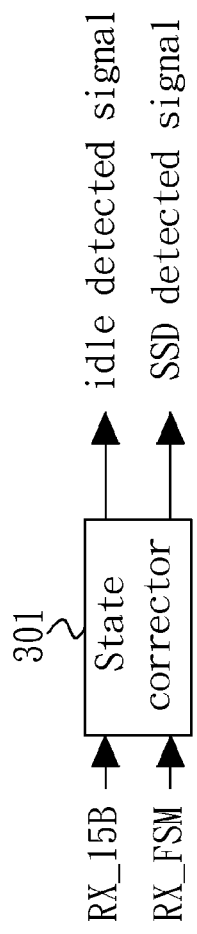
FIG. 4A shows an equivalent block diagram of the state corrector of FIG. 3 according to the embodiment of the present invention.

FIG. 4A shows an equivalent block diagram of the state corrector 301 according to the embodiment of the present invention. Specifically, the state corrector 301 is operatively coupled to receive a 15-bit parallel data (or receiving data) RX_15B from the S/P converter 150 and the FSM state signal RX_FSM fed back from the FSM 160. The state corrector 301 accordingly generates state trigger signals such as an idle detected signal and a start-of-stream delimiter (SSD) detected signal to the FSM 160.

Figure 4B:
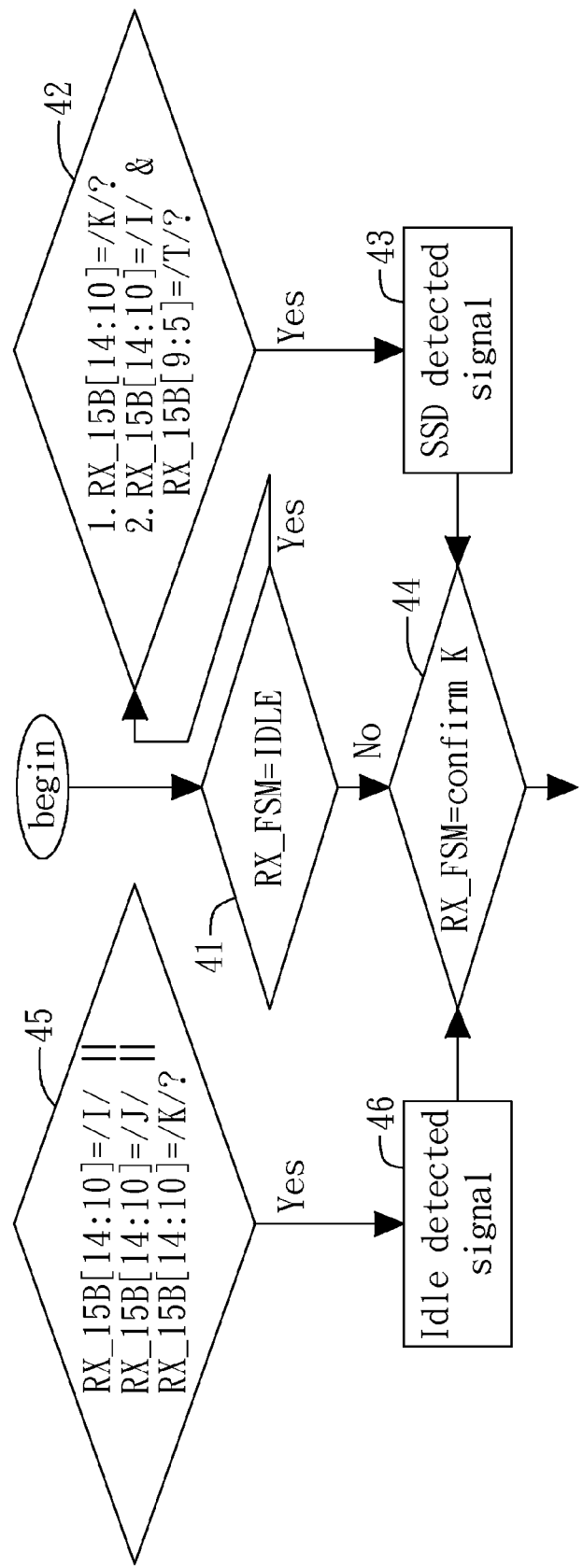
FIG. 4B shows a flow diagram illustrative of a pattern-dependent error correction method associated with the state corrector of FIG. 4A according to the embodiment of the present invention.

FIG. 4B shows a flow diagram illustrative of a pattern-dependent error correction method associated with the state corrector 301 according to the embodiment of the present invention. In step 41, it is determined whether the FSM 160 is in an idle state. If the idle state is positively determined, the flow proceeds to step 42. Otherwise, the flow proceeds to step 44.

In step 42, one or more conditions associated with erroneous code patterns are determined, using pattern recognition and matching technique, in order to recover a lost SSD signal that is supposed to exist at present. In the embodiment, two conditions are determined in step 42: (1) whether the first 5-bit portion of the parallel data RX_15B[14:10] is K code; (2) whether the first two 5-bit portions of the parallel data RX_15B[14:10] and RX_15B[9:5] are I+T code. If any condition has been met, the SSD detected signal is generated (step 43) and forwarded to the FSM 160. Accordingly, in step 44, the FSM 160 is triggered to a state of confirming K code according to the SSD detected signal.

On the other hand, in step 45, one or more conditions associated with erroneous code patterns are determined, using pattern recognition and matching technique, in order to recover a lost idle signal that is supposed to exist at present. In the embodiment, it is determined whether the first 5-bit portion of the parallel data RX_15B[14:10] is I code, J code or K code. If any condition has been met, the idle detected signal is generated (step 46) and forwarded to the FSM 160. Accordingly, in step 44, the FSM 160 is triggered to a state of confirming K code according to the idle detected signal.

According to the state corrector 301 and its associated flow of FIG. 4B, the FSM 160 can be secured to jump to a proper state when erroneous code patterns are present. The FSM 160 can also be prevented from ending in an early stage.

Figure 5A:
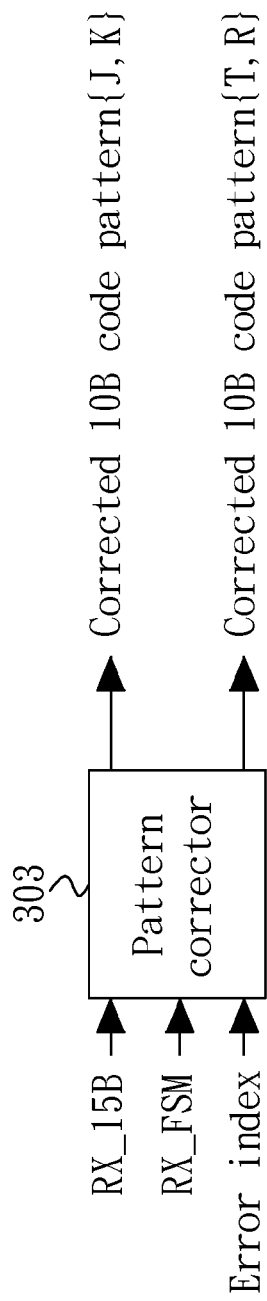
FIG. 5A shows an equivalent block diagram of the pattern corrector of FIG. 3 according to the embodiment of the present invention.

FIG. 5A shows an equivalent block diagram of the pattern corrector 303 according to the embodiment of the present invention. Specifically, the pattern corrector 303 is operatively coupled to receive the 15-bit parallel data RX_15B from the S/P converter 150, the FSM state signal RX_FSM fed back from the FSM 160, and an error index signal generated from the soft slicer 120. A lower error index signal indicates that the parallel data RX_15B has lower credibility or reliability; otherwise, a higher error index signal indicates that the parallel data RX_15B has higher credibility or reliability. The pattern corrector 303 accordingly generates corrected patterns such as a corrected 10B (or 10-bit) code pattern {J,K} and a corrected 10B code pattern {T,R} to the FSM 160.

Figure 5B:
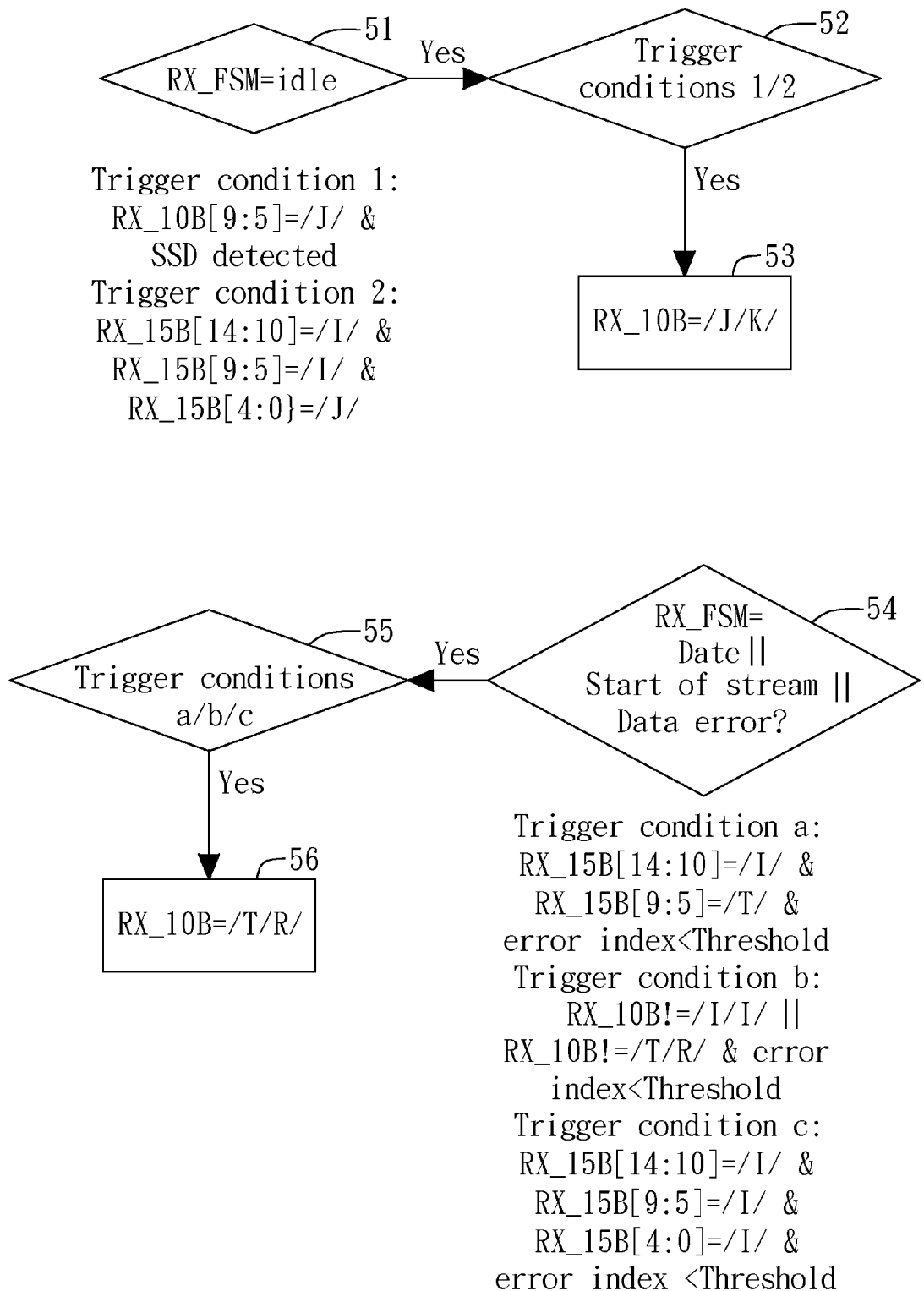
FIG. 5B shows a flow diagram illustrative of a pattern-dependent error correction method associated with the pattern corrector of FIG. 5A according to the embodiment of the present invention.

FIG. 5B shows a flow diagram illustrative of a pattern-dependent error correction method associated with the pattern corrector 303 according to the embodiment of the present invention. In step 51, it is determined whether the FSM 160 is in an idle state. If the idle state is positively determined, the flow proceeds to step 52.

In step 52, one or more conditions associated with erroneous code patterns are determined, using pattern recognition and replacement technique, in order to recover a ruined 10-bit code pattern RX_10B that is supposedly present without a false idle state, where RX_10B is generated by the FSM 160. In the embodiment, two conditions are determined in step 52: (1) whether the first 5-bit portion of the 10B code pattern RX_10B[9:5] is J code, provided that the start-of-stream delimiter (SSD) is detected; (2) whether the parallel data RX_15B are I+I+J code. If any condition has been met, the corrected 10B code pattern {J,K} is generated (step 53) and forwarded to the FSM 160. In other words, the erroneous code pattern RX_10B in the FSM 160 is replaced with the corrected 10B code pattern {J,K}.

On the other hand, in step 54, it is determined whether the FSM 160 is in a data state, a start of stream state or a data error state. If one of the states is positively determined, the flow proceeds to step 55.

In step 55, one or more conditions associated with erroneous code patterns are determined, using pattern recognition and replacement technique, in order to recover a ruined 10-bit code pattern RX_10B that is supposedly present without a false packet end. In the embodiment, three conditions are determined in step 55: (a) whether the first two 5-bit portions of the parallel data RX_15B[14:5] is I+T code, provided that the error index signal has a value less than a predetermined threshold; (b) whether the code pattern RX_10B is not I+I code or the code pattern RX_10B is not T+R code, provided that the error index signal has a value less than the predetermined threshold; (c) whether the parallel data RX_15B is I+T+I code, provided that the error index signal has a value less than the predetermined threshold. If any condition has been met, the corrected 10B code pattern {T,R} is generated (step 56) and forwarded to the FSM 160. In other words, the erroneous code pattern RX_10B in the FSM 160 is replaced with the corrected 10B code pattern {T,R}.

According to the pattern corrector 303 and its associated flow of FIG. 5B, the false idle state can be eliminated, or the false packet end can be prevented.

Although specific embodiments have been illustrated and described, it will be appreciated by those skilled in the art that various modifications may be made without departing from the scope of the present invention, which is intended to be limited solely by the appended claims.

What is claimed is:

1. A pattern-dependent error correction method for a code group alignment finite state machine (FSM) in a communication receiver, the method comprising:

inputting a receiving data and an FSM state signal;

determining whether the code group alignment FSM is in an idle state according to the FSM state signal;

determining one or more conditions associated with erroneous code patterns to recover a lost start-of-stream delimiter (SSD) signal that is supposedly present according to the receiving data, when the code group alignment FSM is determined to be in the idle state;

generating an SSD detected signal fed to the code group alignment FSM when one of the conditions for recovering the lost SSD signal is met;

determining one or more conditions associated with erroneous code patterns to recover a lost idle signal that is supposedly present; and generating an idle detected signal fed to the code group alignment FSM when one of the conditions for recovering the lost idle signal is met.

2. The method of claim 1, wherein the receiving data is inputted from a serial-to-parallel converter, and the FSM state signal is inputted from the code group alignment FSM.

3. The method of claim 1, wherein the conditions to be determined for recovering the lost SSD signal comprise:

determining whether a first 5-bit portion of the receiving data is K code; and determining whether first two 5-bit portions of the receiving data are I and T code.

4. The method of claim 1, wherein the conditions to be determined, for recovering the lost idle signal comprise:

determining whether a first 5-bit portion of the receiving data is I code, J code or K code.

5. The method of claim 1, further comprising a step of triggering the code group alignment FSM to a state of confirming K code according to the SSD detected signal or the idle detected signal.

6. A pattern-dependent error correction method for a code group alignment finite state machine (FSM) in a communication receiver, the method comprising:

inputting a receiving data, an FSM state signal and an error index signal indicative of credibility of the receiving data;

determining whether the code group alignment FSM is in an idle state according to the FSM state signal;

determining one or more conditions associated with erroneous code patterns to recover a ruined code pattern that is supposedly present without a false idle state according to the receiving data and the error index signal, when the code group alignment FSM is determined to be in the idle state;

generating a corrected code pattern {J,K} fed to the code group alignment FSM when one of the conditions for recovering the ruined code pattern due to the false idle state is met;

determining whether the code group alignment FSM is in a data state, a start of stream state or a data error state according to the FSM state signal;

determining one or more conditions associated with erroneous code patterns to recover another ruined code pattern that is supposedly present without a false packet end according to the receiving data and the error index signal, when the code group alignment FSM is determined to be in the data state, the start of stream state or the data error state; and generating a corrected code pattern {T,R} fed to the code group alignment FSM when one of the conditions for recovering the ruined code pattern due to the false packet end is met.

7. The method of claim 6, wherein the receiving data is inputted from a serial-to-parallel converter, the FSM state signal is inputted from the code group alignment FSM, and the error index signal is inputted from a soft slicer.

8. The method of claim 6, wherein the conditions to be determined for recovering the ruined code pattern due to the false idle state comprise:

determining whether a first 5-bit portion of the code pattern is J code, provided that start-of-stream delimiter (SSD) is detected; and determining whether the receiving data is I+I+J code.

9. The method of claim 6, wherein the conditions to he determined for recovering the ruined code pattern due to the false packet end comprise:

determining whether first two 5-bit portions of the receiving data are I code and T code, provided that the error index signal has a value less than a predetermined threshold;

determining whether the code pattern is not I+I code or the code pattern is not T+R code, provided that the error index signal has a value less than the predetermined threshold; and determining whether the receiving data is I+T+I code, provided that the error index signal has a value less than the predetermined threshold.

10. The method of claim 6, further comprising a step of replacing the ruined code pattern due to the false idle state with the corrected code pattern {J,K} in the code group alignment FSM.

11. The method of claim 6, further comprising a step of replacing the ruined code pattern due to the false packet end with the corrected code pattern {T,R} in the code group alignment FSM.

12. A pattern-dependent error correction system for a code group alignment finite state machine (FSM) in a communication receiver, the system comprising:

a state corrector configured to input a receiving data and an FSM state signal, wherein the state corrector generates a start-of-stream delimiter (SSD) detected signal fed to the code group alignment FSM when the code group alignment FSM is in an idle state according to the FSM state signal and at least one condition associated with erroneous code patterns due to a lost SSD signal is met; and wherein the state corrector generates an idle detected signal and fed to the code group alignment FSM when at least one condition associated with erroneous code patterns due to a lost idle signal is met; and a pattern corrector configured to input the receiving data, the FSM state signal and an error index signal indicative of credibility of the receiving data, wherein the pattern corrector generates a corrected code pattern. {J,K} fed to the code group alignment FSM when the code group alignment FSM is in an idle state according to the FSM state signal and at least one condition associated with erroneous code patterns due to a false idle state is met; and wherein the pattern corrector generates a corrected code pattern {T,R} fed to the code group alignment FSM when the code group alignment FSM is in a data state, a start of stream state or a data error state according to the FSM state signal, and at least one condition associated with erroneous code patterns due to a false packet end is met.

13. The system of claim 12, wherein the receiving data is inputted from a serial-to-parallel converter, the FSM state signal is inputted from the code group alignment FSM, and the error index signal is inputted from a soft slicer.

14. The system of claim 12, wherein the at least one condition associated with erroneous code patterns due to the lost SSD signal comprises:

determining whether a first 5-bit portion of the receiving data is K code; and determining whether first two 5-bit portions of the receiving data are I and T code.

15. The system of claim 12, wherein the at least one condition associated with erroneous code patterns due to the lost idle signal comprises:

determining whether a first 5-bit portion of the receiving data is I code, J code or K code.

16. The system of claim 12, wherein the code group alignment FSM is triggered, to a state of confirming K code according to the SSD detected signal or the idle detected signal.

17. The system of claim 12, wherein the at least one condition associated with erroneous code patterns due to the false idle state comprises:
   determining whether a first 5-bit portion of the code pattern is J code, provided that start-of-stream delimiter (SSD) is detected; and
   determining whether the receiving data is I+I+J code.

18. The system of claim 12, wherein the at least one condition associated with erroneous code patterns due to the false packet end comprises:
   determining whether first two 5-bit portions of the receiving data are I code and T code, provided that the error index signal has a value less than a predetermined threshold;
   determining whether the code pattern is not I+I code or the code pattern is not T+R code, provided that the error index signal has a value less than the predetermined threshold; and
   determining whether the receiving data is I+T+I code, provided that the error index signal has a value less than the predetermined threshold.

19. The system of claim 12, wherein the code group alignment FSM replaces a ruined code pattern due to the false idle state with the corrected code pattern {J,K}.

20. The system of claim 12, wherein the code group alignment FSM replaces a ruined code pattern due to the false packet end with the corrected code pattern {T,R}.

* * * * *